US009753116B2

(12) United States Patent
Ejima

(10) Patent No.: US 9,753,116 B2
(45) Date of Patent: Sep. 5, 2017

(54) INFORMATION PROCESSING APPARATUS, METHOD AND INFORMATION PROCESSING SYSTEM

(71) Applicant: Takeshi Ejima, Tokyo (JP)

(72) Inventor: Takeshi Ejima, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 476 days.

(21) Appl. No.: 14/462,913

(22) Filed: Aug. 19, 2014

(65) Prior Publication Data

US 2015/0054684 A1 Feb. 26, 2015

(30) Foreign Application Priority Data

Aug. 22, 2013 (JP) .................. 2013-172303
Jul. 30, 2014 (JP) .................. 2014-154375

(51) Int. Cl.
| | |
|---|---|
| *G01S 19/13* | (2010.01) |
| *G01S 5/02* | (2010.01) |
| *H04W 4/02* | (2009.01) |
| *H04W 4/22* | (2009.01) |
| *G01S 19/48* | (2010.01) |
| *H04W 4/06* | (2009.01) |

(52) U.S. Cl.
CPC .......... *G01S 5/02* (2013.01); *G01S 19/13* (2013.01); *G01S 19/48* (2013.01); *H04W 4/02* (2013.01); *H04W 4/22* (2013.01); *H04W 4/06* (2013.01)

(58) Field of Classification Search
CPC ........... G01S 19/13; G01S 19/48; G01S 5/02; H04W 4/02; H04W 4/06; H04W 4/22

USPC .................................. 342/357.51
See application file for complete search history.

(56) References Cited

U.S. PATENT DOCUMENTS

| 8,249,914 | B2 | 8/2012 | Umeda | |
|---|---|---|---|---|
| 8,618,978 | B2 | 12/2013 | Torimoto et al. | |
| 2014/0005506 | A1* | 1/2014 | Elghazzawi | A61B 5/0205 |
| | | | | 600/324 |

FOREIGN PATENT DOCUMENTS

| JP | H08-162909 | 6/1996 |
|---|---|---|
| JP | 2005-158007 | 6/2005 |
| JP | 2009-133731 | 6/2009 |
| JP | 2010-068162 | 3/2010 |
| JP | 2010-124052 | 6/2010 |
| JP | 2011-227808 | 11/2011 |

* cited by examiner

*Primary Examiner* — Harry Liu
(74) *Attorney, Agent, or Firm* — Oblon, McClelland, Maier & Neustadt, L.L.P.

(57) ABSTRACT

An information processing apparatus capable of detecting an emergency signal includes a first obtainment unit configured to obtain positional information representing a current position of the information processing apparatus; a selection unit configured to select one of a plurality of broadcast stations using the positional information obtained by the first obtainment unit; a reception unit configured to receive a radio wave signal at a frequency of the broadcast station selected by the selection unit; and a first output unit configured to output an audio signal obtained by demodulating the radio wave signal received by the reception unit.

13 Claims, 14 Drawing Sheets

FIG.5

| NAME OF PREFECTURE | NAME OF BROADCAST STATION | FREQUENCY [MHz] | POSITIONAL INFO | |
|---|---|---|---|---|
| | | | LATITUDE | LONGITUDE |
| ⋯ | ⋯ | ⋯ | ⋯ | ⋯ |
| KUMAMOTO | KUMAMOTO | 85.4 | 32.7997 | 130.7102 |
| | HITOYOSHI | 82.8 | 32.2066 | 130.7648 |
| | MINAMATA | 82.5 | 32.2084 | 130.4109 |
| | HIGOOGUNI | 83.9 | 33.1182 | 131.0705 |
| | ASO | 86.3 | 32.9485 | 131.1233 |
| | SOYOU | 86.8 | 32.8515 | 131.1424 |
| | YABE | 89.8 | 32.6839 | 130.9962 |
| | ITSUKI | 84.0 | 32.3942 | 130.8305 |
| | ⋯ | ⋯ | ⋯ | ⋯ |
| ⋯ | | | | |

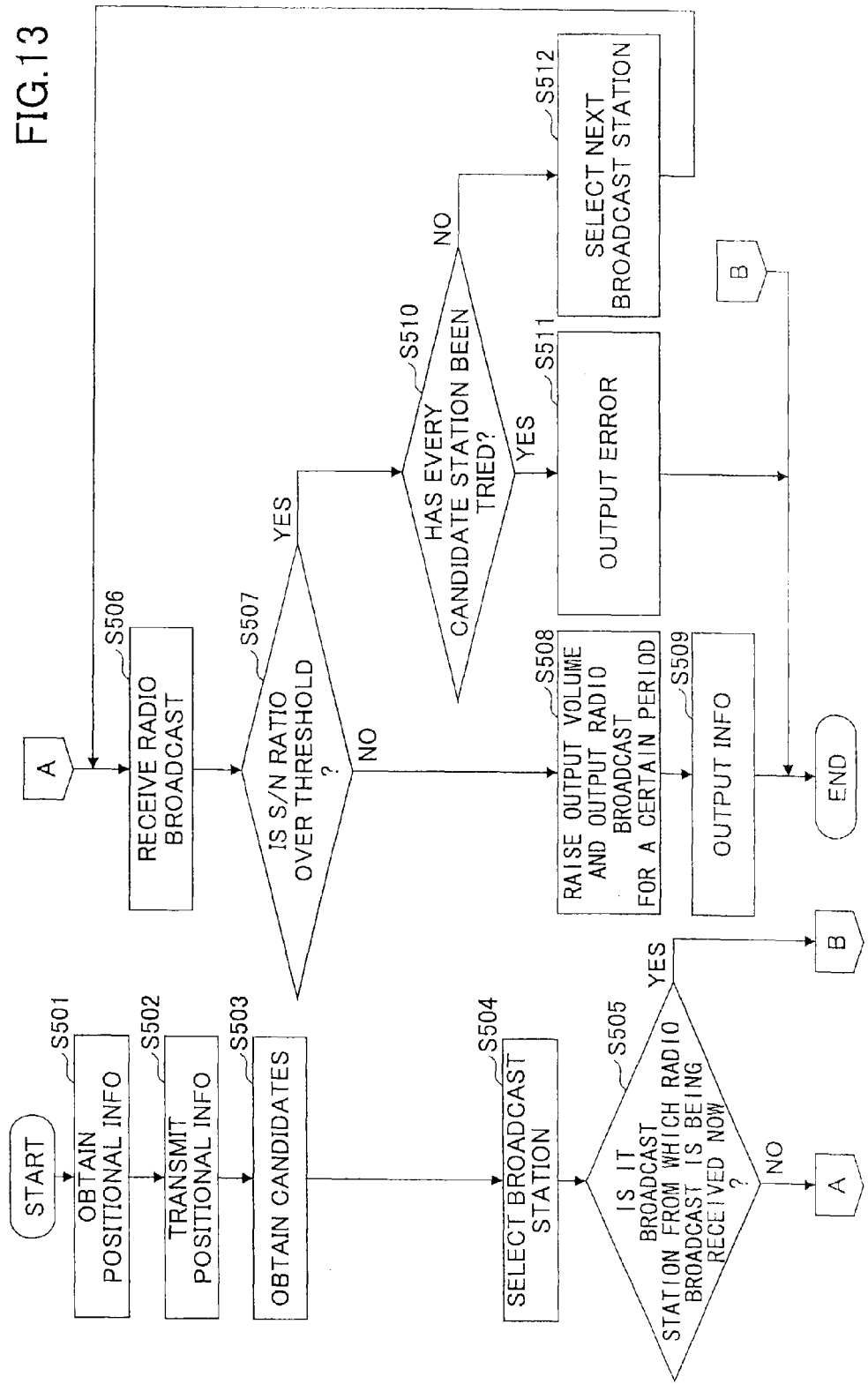

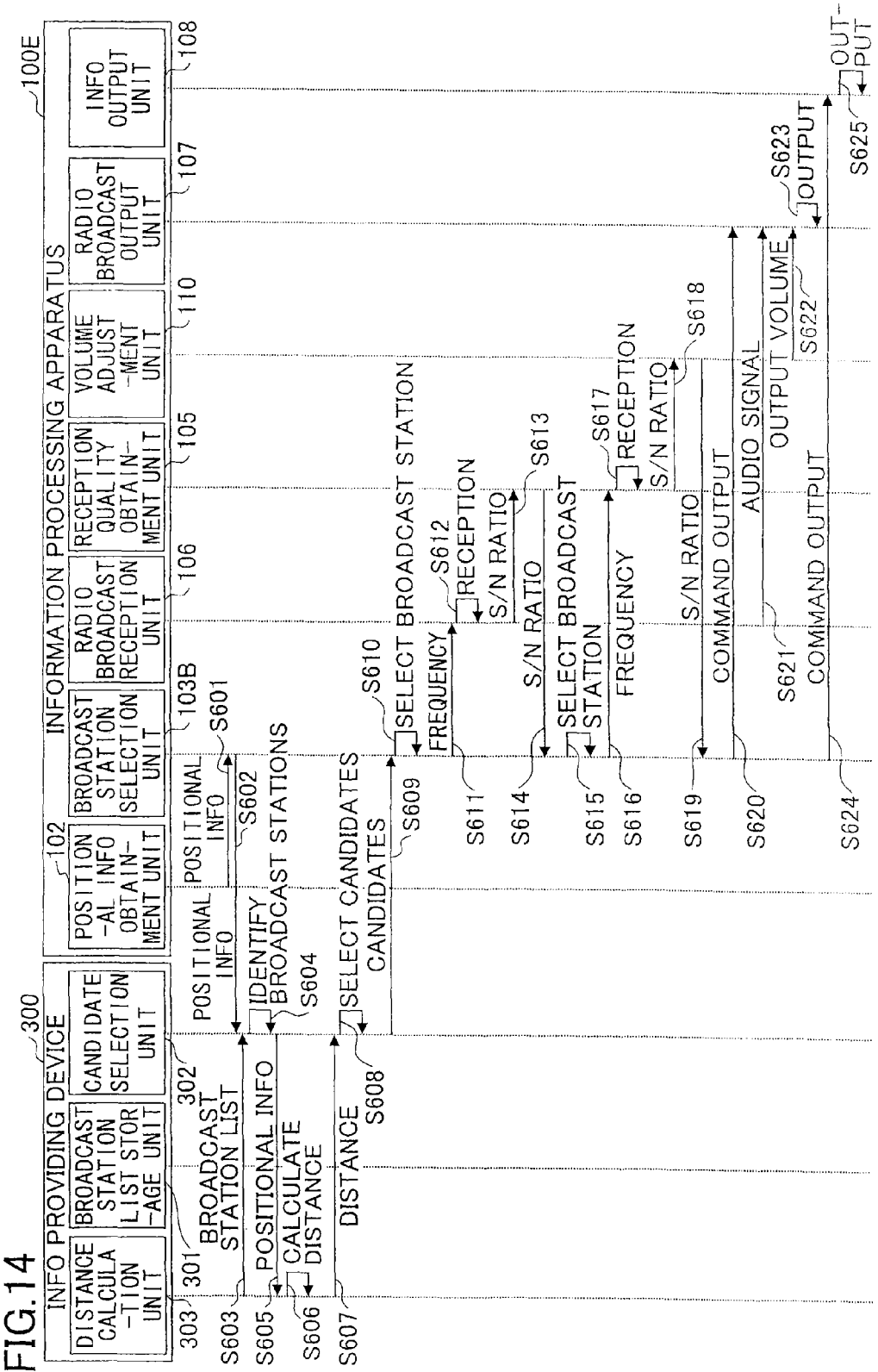

INFORMATION PROCESSING APPARATUS, METHOD AND INFORMATION PROCESSING SYSTEM

BACKGROUND OF THE INVENTION

1. Field of the Invention

The disclosures herein generally relate to an information processing apparatus, a method, and an information processing system.

2. Description of the Related Art

An apparatus has been known that detects an emergency signal of an earthquake early warning system or an emergency warning system transmitted via a radio wave broadcast such as FM radio to indicate it to a user. Such an apparatus is kept receiving the radio wave broadcast at a minimum volume, and once a specific alarm sound indicating an emergency signal is detected in the radio wave broadcast, it increases the volume to a certain volume to indicate that the emergency signal has been issued. Among such apparatuses already on the market, a has the weight of 500 g or less so that a user can bring it when making a journey or a business trip.

For example, Patent Document 1 discloses an apparatus that reproduces a chime sound whose volume is increased to a predetermined level when detecting an earthquake early warning system signal in a radio wave broadcast from an FM radio broadcast station set by a user beforehand.

However, a conventional method has a problem that an emergency signal cannot be received if a user who brings an apparatus capable of detecting an emergency signal goes out of the receivable range of a broadcast station set beforehand.

RELATED-ART DOCUMENTS

Patent Documents

[Patent Document 1] Japanese Laid-open Patent Publication No. 2011-227808

SUMMARY OF THE INVENTION

In view of the above, it is a general object of at least one embodiment of the present invention to provide an information processing apparatus that substantially obviates one or more problems caused by the limitations and disadvantages of the related art. Specifically, it may be desirable to provide an information processing apparatus that can receive an emergency signal that can be detected via a radio wave signal regardless of the position.

According to at least one embodiment of the present invention, an information processing apparatus capable of detecting an emergency signal includes a first obtainment unit configured to obtain positional information representing a current position of the information processing apparatus; a selection unit configured to select one of a plurality of broadcast stations using the positional information obtained by the first obtainment unit; reception unit configured to receive a radio wave signal at a frequency of the broadcast station selected by the selection unit; and a first output unit configured to output an audio signal obtained by demodulating the radio wave signal received by the reception unit.

According to at least one embodiment of the present invention, it is possible to receive an emergency signal that can be detected via a radio wave signal regardless of the position.

BRIEF DESCRIPTION OF DRAWINGS

FIG. 5 is a diagram illustrating an example of a broadcast station list;

FIG. 13 is a flowchart illustrating a process of an information processing apparatus; and FIG. 14 is a sequence chart illustrating an operational example of an information processing apparatus.

DESCRIPTION OF THE PREFERRED EMBODIMENTS

Figure 1:
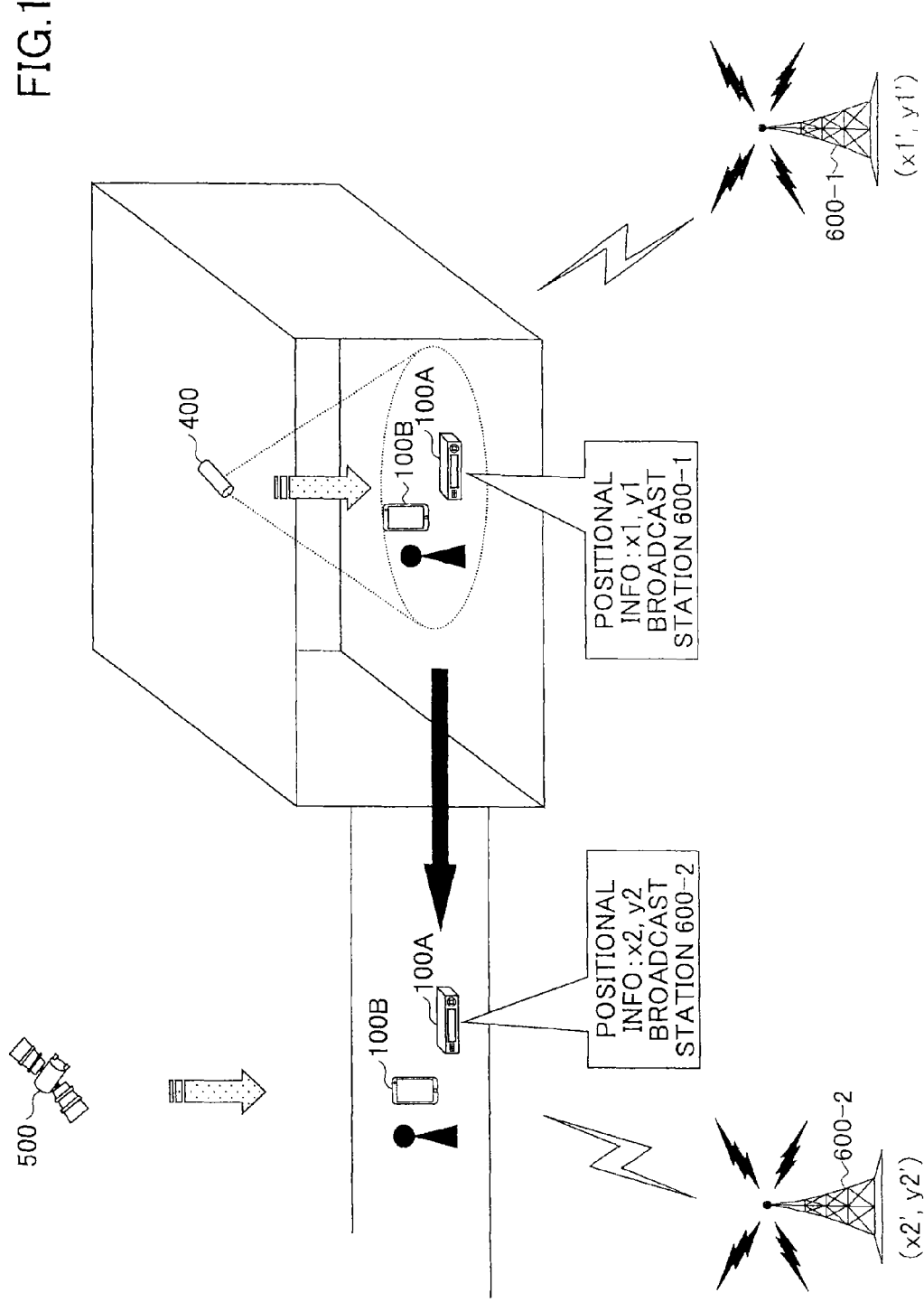
FIG. 1 is a general view illustrating an overall configuration of the present invention.

In the following, embodiments of the present invention will be described with reference to the drawings.

1. Overview
2. Hardware configuration
2.1 Example of earthquake warning device
2.2 Example of cellular phone
3. Functions
4. Operational example
4.1 Process flow of information processing apparatus (soon after being moved)
4.2 Process flow of information processing apparatus (not moved)
4.3 Operational sequence of information processing apparatus
5. Modified example 1
5.1 Hardware configuration
5.2 Functions
5.3 Operational example
6. Modified example 2
6.1 Hardware configuration
6.2 Functions
6.3 Operational example

1. OVERVIEW

FIG. 1 illustrates an overview of an information processing apparatuses 100 according an embodiment of the present invention. FIG. 1 illustrates two forms of the information processing apparatuses 100. One is the information processing apparatus 100A stored in a special radio-shaped housing, and the other is the information processing apparatus 100B, or a cellular phone.

The information processing apparatuses 100 can receive a radio wave of FM radio or TV, for example, from a broadcast station 600, and can detect an emergency signal such as an earthquake early warning system or an emergency warning system distributed in the radio wave broadcast. Also, the information processing apparatuses 100 can receive a positioning signal representing the current position of itself, which is transmitted from a GPS satellite or a transmitter that transmits a signal compliant with IMES (Indoor Messaging System) standards. The positional information includes, for example, information about latitude and longitude.

The information processing apparatus 100 has a list of broadcast stations 600. The list includes positional information (latitude and longitude) representing positions where the broadcast stations 600 are built, and channel (frequency) information of the broadcast stations. Based on obtained current positional information, the information processing apparatus 100 calculates distances to the broadcast stations 600 from the current position, and sets the channel to a nearby broadcast station 600, and receives the radio wave broadcast. When detecting a specific alarm sound as an emergency signal, the information processing apparatus 100 increases the volume to indicate to a user that the emergency signal has been received.

In FIG. 1, at first, the information processing apparatuses 100A and 100B positioned doors receive a positioning signal from an IMES transmitter installed on the indoor ceiling, and obtains positional information (latitude "x1" and longitude "y1"). Then, the information processing apparatuses 100 select a broadcast station 600-1 that is located at a position (latitude "x1'" and longitude "y1'") closest to their position. On the other hand, when the information processing apparatuses 100 move outdoors, they calculate a current positional information (latitude "x2" and longitude "y2") using a positioning signal transmitted from a GPS satellite, and they select a broadcast station 600-2 that is located at a position (latitude "x2'" and longitude "y2'") closest to their updated position. By these operations, the information processing apparatuses 100 can receive an emergency signal from a broadcast station closest to their current position to indicate to a user that the emergency signal has been received.

2. HARDWARE CONFIGURATION

Next, using FIGS. 2-3, a hardware configuration of the information processing apparatuses 100A and 100B will be described according to an embodiment of the present invention.

2.1 Example of Earthquake Warning Device

Figure 2:
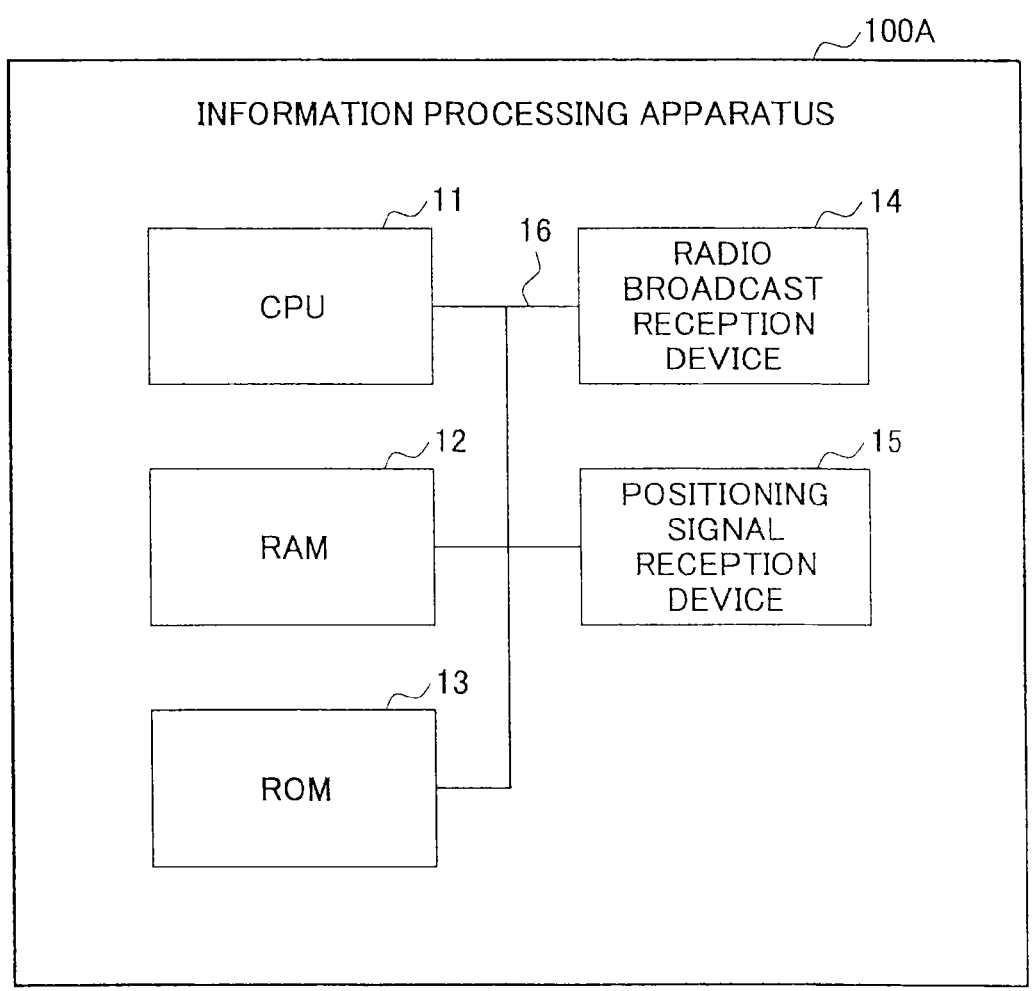
FIG. 2 is a hardware configuration diagram of an information processing apparatus according to an embodiment of the present invention.

FIG. 2 is a hardware configuration example where the information processing apparatus 100A is an earthquake warning device. The information processing apparatus 100A includes a CPU 11, a RAM 12, a ROM 13, a radio broadcast reception device 14, and a positional signal reception device 15.

The CPU 11 executes a program to control operations of the information processing apparatus 100A. The RAM 12 constitutes a work area of the CPU 11. The ROM 13 stores a system program of the information processing apparatus 100A, a list of broadcast stations, and the like. The radio broadcast reception device 14 demodulates a radio wave such as a short wave, a medium wave, or an ultrashort wave having an audio signal modulated, to receive a radio wave broadcast. The positional signal reception device 15 is a device to receive a positioning signal transmitted from a GPS satellite or an IMES transmitter to obtain the latitude and longitude. A bus 16 electrically connects the devices with each other.

Configured as above, the information processing apparatus 100A in the present embodiment can automatically select a nearby broadcast station, and once an emergency signal is transmitted, it con indicate that to the user. Note that the information processing apparatus 100A may include an LCD display to display characters and numbers, a loudspeaker to output sound, and an operation button to adjust volume.

2.2 Example of Cellular Phone

Figure 3:
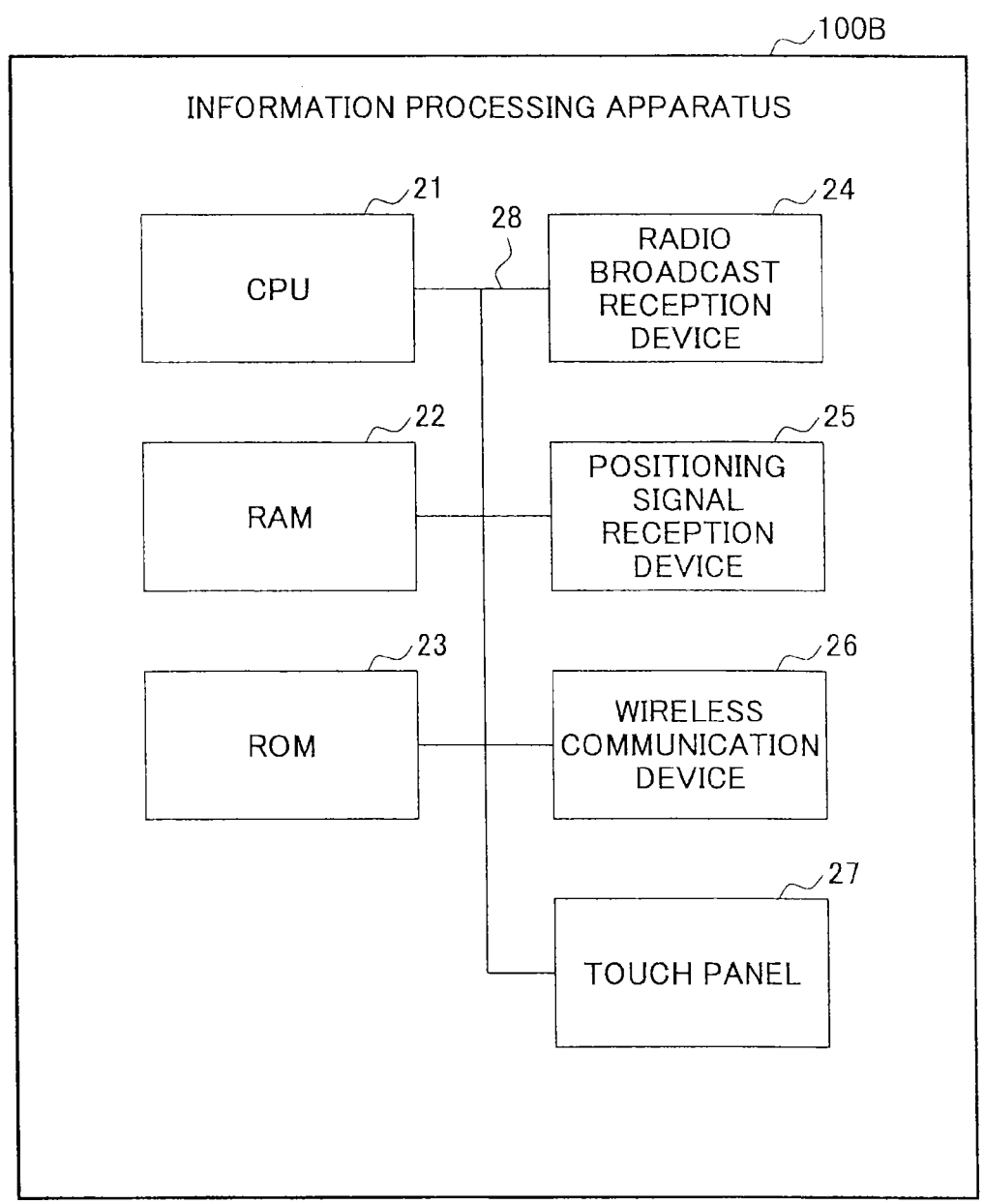
FIG. 3 is a hardware configuration diagram of an information processing apparatus according to an embodiment of the present invention.

FIG. 3 is a hardware configuration example where the information processing apparatus 100B is a cellular phone represented by a smart phone. The information processing apparatus 100B includes CPU 21, a RAM 22, a ROM 23, a radio broadcast reception device 24, a positional signal reception device 25, wireless communication device 26, and a touch panel 27.

The CPU 21 executes a program to control operations of the information processing apparatus 100B operation control. The RAM 22 constitutes a work area of the CPU 21. The ROM 23 stores a system program of the information processing apparatus 100B, a list of broadcast stations, and the like. The radio broadcast reception device 24 demodulates radio wave such as a short wave, a medium wave, or an ultrashort wave having an audio signal modulated, to receive a radio wave broadcast. The positional signal reception device 25 is a device to receive a positioning signal transmitted from a GPS satellite or an IMES transmitter to obtain the latitude and longitude. The wireless communication device 26 is a device to communicate with an external device via, for example, a 3G or 4G network, a wireless LAN, or the like. The touch panel 27 is an electronic device that combines a display unit such as an LCD panel with a position input unit such as a touch pad, to receive an operational input when a user pushes a displayed object on the screen. A bus 28 electrically connects the devices with each other.

Configured as above, the information processing apparatus 100B in the present embodiment can automatically select a nearby broadcast station, and once an emergency signal is transmitted, it can indicate that to the user. Note that the information processing apparatus 100B may include a loudspeaker to output sound, and an operation button to adjust volume.

3. FUNCTIONS

Figure 4:
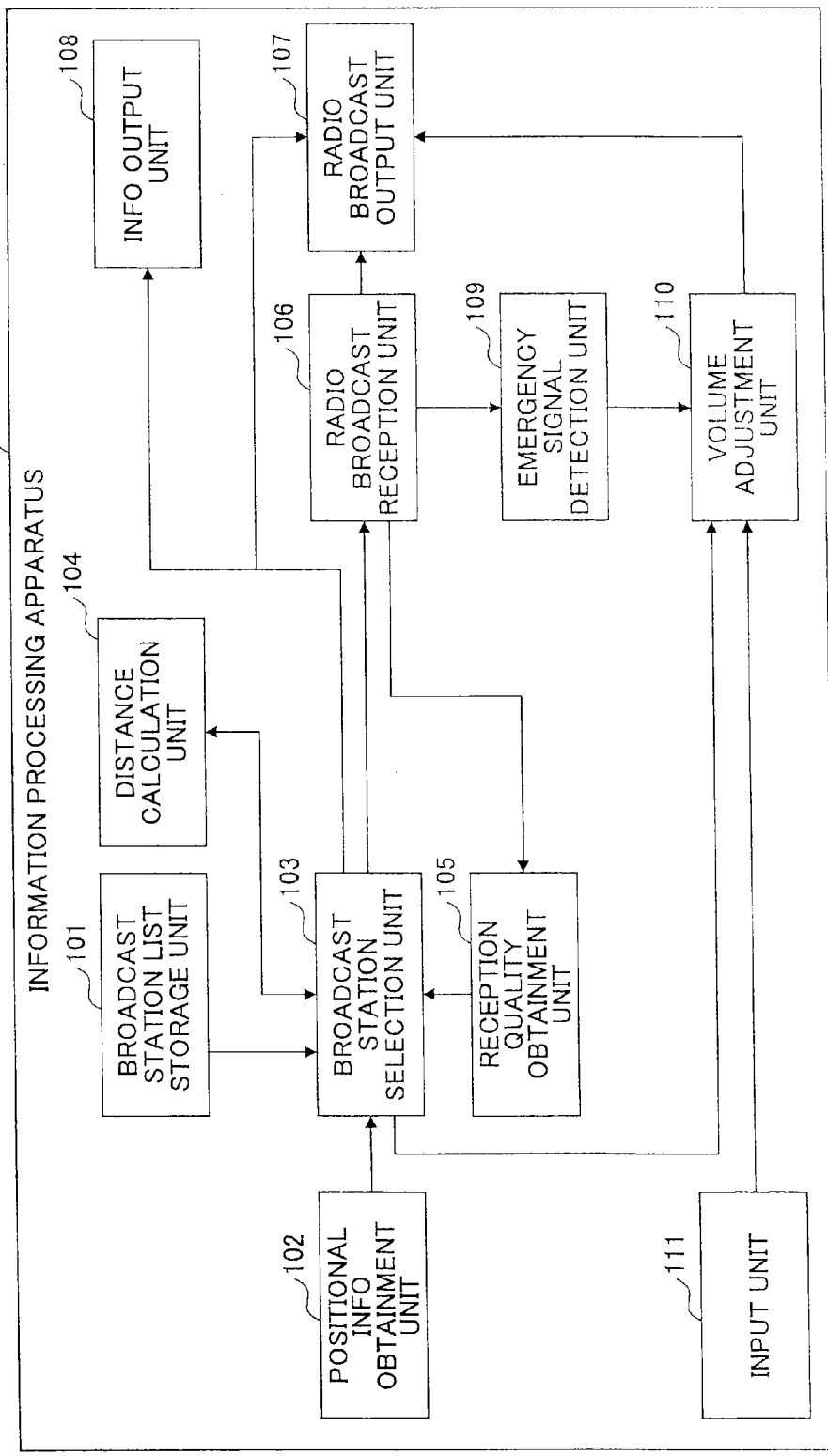
FIG. 4 is a functional block diagram of an information processing apparatus according to an embodiment of the present invention.

Next, functional blocks of the information processing apparatuses 100 in the present embodiment will be described using FIG. 4. Among various elements provided in these apparatuses, FIG. 4 illustrates elements specifically relating to description of the present embodiment.

The information processing apparatus 100 in the present embodiment includes a broadcast station list storage unit 101, a positional information obtainment unit 102, a broadcast station selection unit 103, a distance calculation unit 104, a reception quality obtainment unit 105, a radio broadcast reception unit 106, a radio broadcast output unit 107, an information output unit 108, an emergency signal detection unit 109, a volume adjustment unit 110, and an input unit 111.

Figure 6:
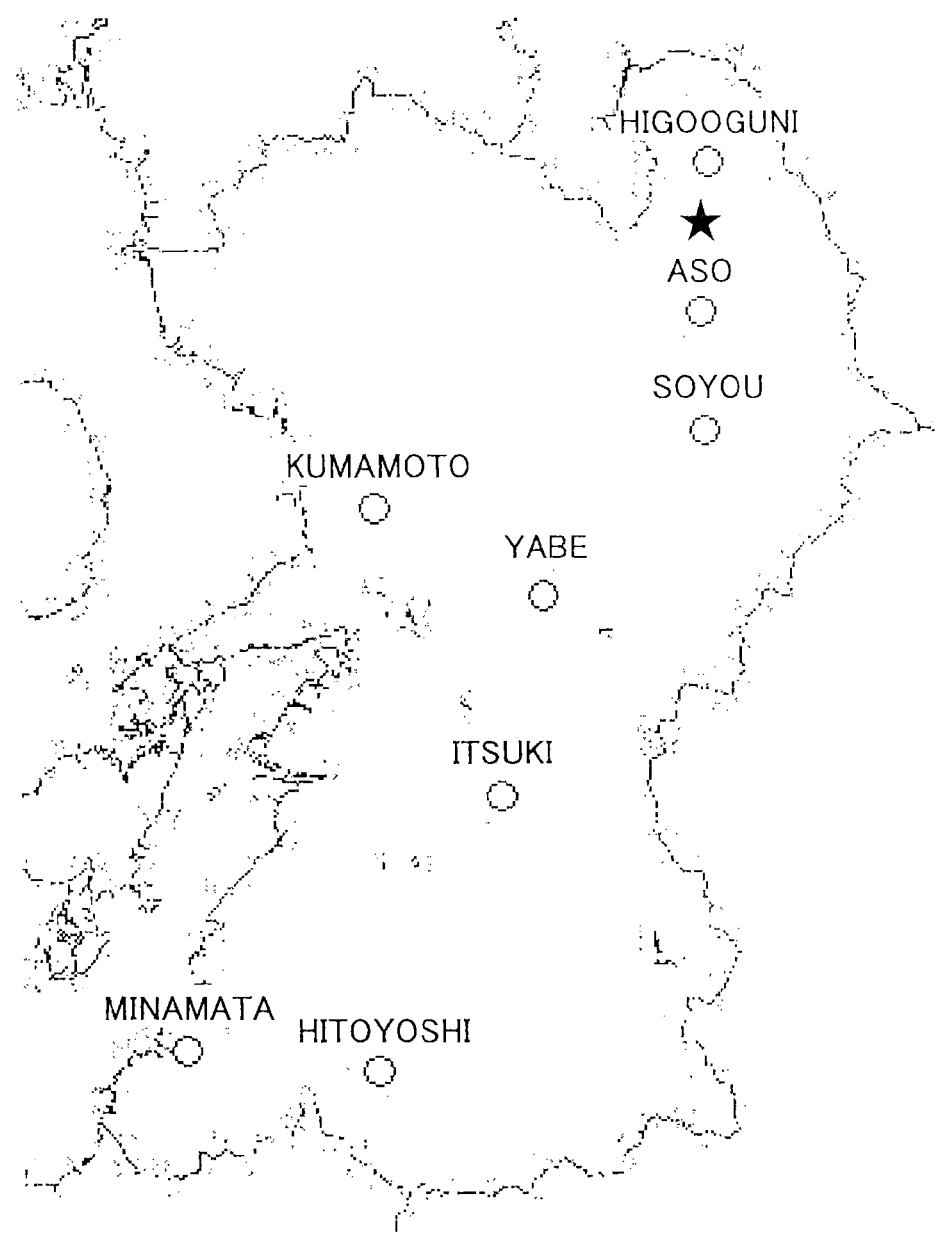
FIG. 6 is a diagram illustrating an example of positions of broadcast stations.

The broadcast station list storage unit 101 is implemented by the ROM 13 illustrated in FIG. 2 (or the ROM 23 illustrated in FIG. 3), and stores a broadcast station list that is a list of broadcast stations. FIG. 5 is an example of the broadcast station list. The broadcast station list includes the following items.

name of prefecture: a prefecture where a broadcast station is located;

name of broadcast station: a name given to a broadcast station;

frequency: a frequency band (channel) of the radio wave transmitted by a broadcast station; and positional information (latitude and longitude) the position of a broadcast station. Note that FIG. 6 illustrates the positions of eight broadcast stations in the example in FIG. 5 on an actual map. Also, although it is preferable to store the broadcast station list in the information processing apparatus 100 beforehand, it may be obtained from an external server via a network when necessary.

The positional information obtainment unit 102 is implemented by a process of the CPU 11 and the positional signal reception device 15 illustrated in FIG. 2 (or the CPU 21 and the positional signal reception device 25 illustrated in FIG. 3). The positional information obtainment unit 102 receives a positioning signal transmitted from a GPS or an IMES transmitter to obtain positional information (latitude and longitude) representing the current position of the information processing apparatus 100. The positional information obtainment unit 102 transfers the obtained positional information to the broadcast station selection unit 103. Note that the positional information obtainment unit 102 may repeatedly obtain the positional information at arbitrary timings.

The broadcast station selection unit 103 is implemented by a process of the CPU 11 and the rad broadcast reception device 14 illustrated in FIG. 2 (or the CPU 21 and the radio broadcast reception device 24 illustrated in FIG. 3), which uses the positional information received from the positional information obtainment unit 102 to select a broadcast station that satisfies a certain condition, and transfers the frequency of the broadcast station to the radio broadcast reception unit 106.

Specifically, when receiving the positional information from the positional information obtainment unit 102, the broadcast station selection unit 103 reads the broadcast station list stored in the broadcast station list storage unit 101. Next, the broadcast station selection unit 103 identifies broadcast stations within a predetermined range (for example, latitude ±05°, longitude ±05°) from the latitude and longitude indicated by the received positional information. Next, the broadcast station selection unit 103 transfers the current positional information and the positional information of the identified broadcast stations to the distance calculation unit 104 to obtain distances to the identified broadcast stations from the current position. Next, the broadcast station selection unit 103 compares the distances to the broadcast stations to select a predetermined number of broadcast stations as candidates by prioritizing stations having shorter distances (closer to the current position) in order. Then, the broadcast station selection unit 103 selects a broadcast station at the highest rank (namely, a broadcast station closest to the current position) among the candidate broadcast stations, and transfers its frequency to the radio broadcast reception unit 106.

Also, the broadcast station selection unit 103 obtains the signal-to-noise ratio of a radio wave signal received from a currently selected broadcast station from the reception quality obtainment unit 105, and if the signal-to-noise ratio is less than a predetermined threshold, transfers the frequency of the broadcast station of the next rank among the candidates to the radio broadcast reception unit 106. In this way, the broadcast station selection unit 103 picks up a broadcast station selected as a candidate in order prioritizing one having a closer distance, to find a broadcast station having the signal-to-noise ratio greater than or equal to the threshold.

If all broadcast stations selected as the candidates have the signal-to-noise ratios less than the threshold, the broadcast station selection unit 103 has the information output unit 108 output a message stating that a broadcast station cannot be selected.

Also, while the broadcast station selection unit 103 is outputting the broadcast from the selected broadcast station and the positional information remains unchanged, if the signal-to-noise ratio is reduced below the threshold for some reason, it issues a command to raise the volume for a certain period to the volume adjustment unit 110. Then, the broadcast station selection unit 103 has the information output unit 108 output a message stating that. By the message, the user is able to know that a broadcast radio wave having a certain quality or greater is not being received from the selected broadcast station.

The distance calculation unit 104 is implemented by a process of the CPU 11 illustrated in FIG. 2 (or the CPU 21 illustrated in FIG. 3). The distance calculation unit 104 calculates distances between the broadcast stations and the current position, using the positional information representing the current position of the information processing apparatus received from the broadcast station selection unit 103, and the positional information representing the positions of the broadcast stations. The distance calculation unit 104 transfers the calculated distances to the broadcast station, to the broadcast station selection unit 103. Note that, the distance calculation unit 104 may use a value obtained, for example, by the following formula to represent the distance between the current positional information (x1, y1) and positional information (x1', y1') of a broadcast station.

$$(x1'-x1)^2+(y1'-y1)^2$$

Note that it is not limited to this example, but an arbitrary appropriate method may use to obtain the distance between two positions.

The reception quality obtainment unit 105 is implemented by a process of the CPU 11 and the radio broadcast reception device 14 illustrated in FIG. 2 (or the CPU 21 and the radio broadcast reception device 24 illustrated in FIG. 3) to obtain a signal-to-noise ratio (S/N ratio) relating to the radio wave broadcast currently received by the radio broadcast reception unit 106. The reception quality obtainment unit 105 transfers the obtained signal-to-noise ratio to the broadcast station selection unit 103.

The radio broadcast reception unit 106 is implemented by a process of the CPU 11 and the radio broadcast reception device 14 illustrated in FIG. 2 (or the CPU 21 and the radio broadcast reception device 24 illustrated in FIG. 3). The radio broadcast reception unit 106 receives from the broadcast station selection unit 103 a received radio wave (radio wave signal) at the frequency, and demodulates the radio wave signal to obtain an audio signal. The radio broadcast reception unit 106 transfers the obtained audio signal to the radio broadcast output unit 107.

The radio broadcast output unit 107 is implemented by a process of the CPU 11 illustrated in FIG. 2 (or the CPU 21 illustrated in FIG. 3) to output the audio signal obtained by the radio broadcast reception unit 106 as voice. Note that the radio broadcast output unit 107 changes the output volume of the voice depending on an output volume value transferred from the volume adjustment unit 110.

The information output unit 108 is implemented by a process of a display unit (not illustrated in FIG. 2 or the touch panel illustrated in FIG. 3) to output the name and/or the frequency of the broadcast station selected by the broadcast station selection unit 103 on the screen or by a sound. Also, the information output unit 108 outputs a message received from the broadcast station selection unit 103 on the screen or by a sound.

The emergency signal detection unit 109 implemented by a process of the CPU 11 illustrated in FIG. 2 (or the CPU 21 illustrated in FIG. 3) to monitor whether the alarm sound of a known emergency signal is included in the audio signal demodulated by the radio broadcast reception unit 106. If detecting that the emergency signal includes the alarm sound, the emergency signal detection unit 109 indicates to the volume adjustment unit 110.

The volume adjustment unit 110 it is implemented by a process of the CPU 11 illustrated in FIG. 2 (or the CPU 21 illustrated in FIG. 3) to transfer a minimum-level output volume value to the radio broadcast output unit 107 when an emergency signal is detected, and when no command is issued by the broadcast station selection unit 103. On the other hand, in response to receiving an indication that the alarm sound of an emergency signal is included in the audio signal from the emergency signal detection unit 109, the volume adjustment unit 110 transfers an output volume value to output: volume at a predetermined level to the radio broadcast output unit 107. The predetermined level is set by a user beforehand. It is preferable to set an output volume value with which sound great enough to indicate an emergency signal can be output.

Also, in response to a command issued by the broadcast station selection unit 103, the volume adjustment unit 110 raises the output volume to predetermined level, although it can be less than the level used when an emergency signal is received.

Also, the volume adjustment unit 110 adjusts the output volume of the radio broadcast output unit depending on an input from the input unit 111.

The input unit 111 is implemented by a process of operation buttons (not illustrated in FIG. 2 or the touch panel 27 illustrated in FIG. 3) to receive an input specifying the output volume from a user, and to transfer the input to the volume adjustment unit 110.

By the above functions, the information processing apparatus in the present embodiment can automatically select a broadcast station that is close to the current position and satisfies a certain level of communication quality, to indicate to a user that an emergency signal has been received. Consequently, the user can receive an indication of an emergency signal without knowing frequency information of a broadcast station in a region to which the user is going to move.

Moreover, in the present embodiment, when detecting an emergency signal included in an audio signal, the information processing apparatus 100 raises the volume to output an alarm sound of the emergency signal. Therefore, in the present embodiment, the information processing apparatus 100 can draw the user' attention to the indication of an emergency signal.

The volume after having detected an emergency signal may be set to, for example, maximum volume that can be set on the information processing apparatus 100, or a volume greater than that which has been set before detecting the emergency signal. Also, if the volume is set greater than the predetermined level when detecting the emergency signal, the setting of the volume may be kept unchanged.

4. OPERATIONAL EXAMPLES

Next, using FIGS. 7-9, operational examples of the information processing apparatus 100 will be described.

4.1 Process Flow of Information Processing Apparatus (Soon After Being Moved)

Figure 7:
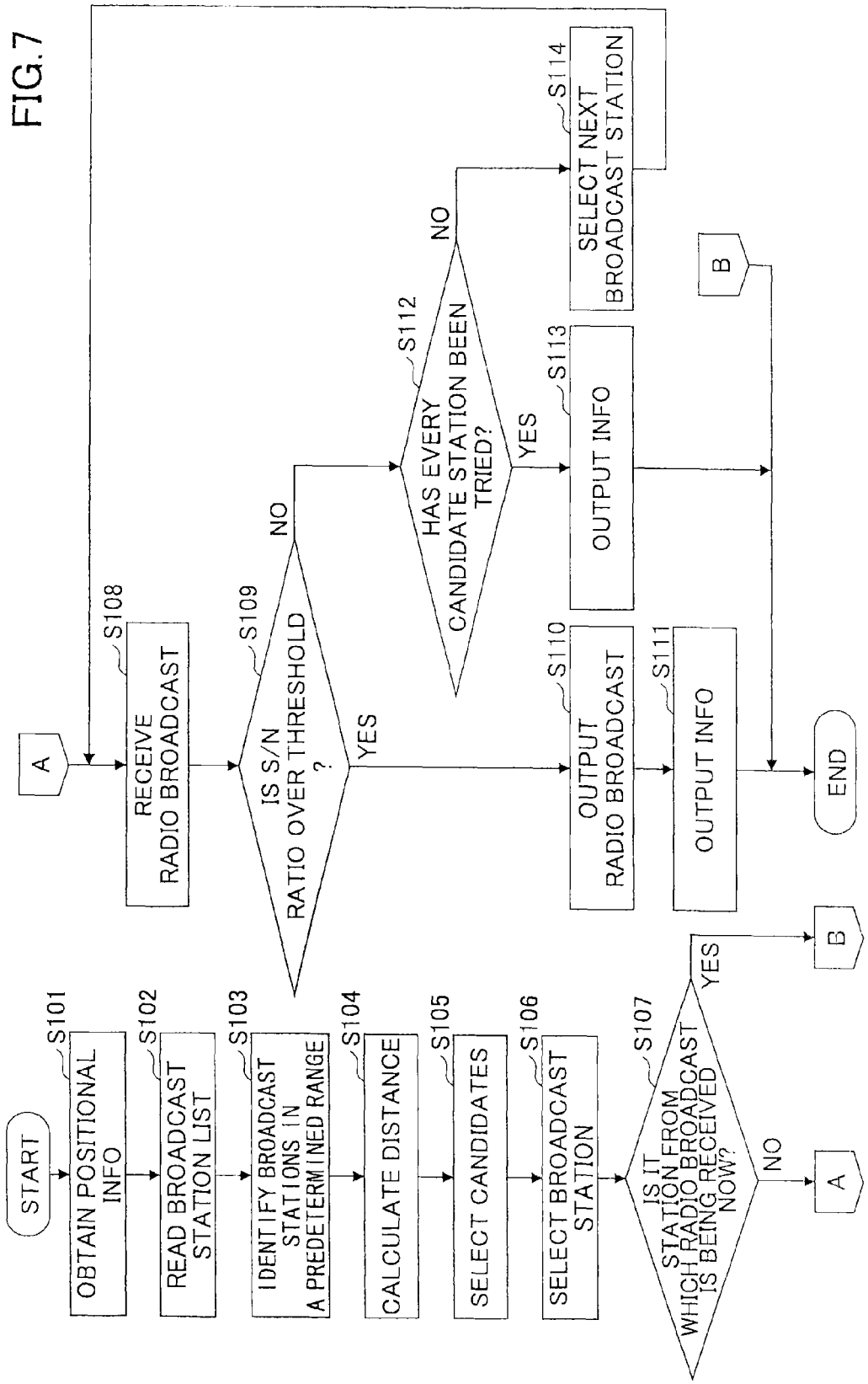
FIG. 7 is a flowchart illustrating a process of an information processing apparatus.

FIG. 7 is a flowchart of a process to select a broadcast station using new positional information after the information processing apparatus 100 in the present embodiment has been moved by a user.

First, the positional information obtainment unit 102 obtains positional information representing the current position of the information processing apparatus 100 by a positioning signal transmitted from a GPS satellite or an IMES transmitter (Step S101). Next, the broadcast station selection unit 103 reads the broadcast station list (FIG. 5) stored in the broadcast station list storage unit 101 (Step S102). Then, the broadcast station selection unit 103 identifies broadcast stations within a predetermined range using the latitude and longitude indicated by the positional information obtained at Step S101 (Step S103).

Next, the distance calculation unit 104 calculates the distances between the current position indicated by the positional information obtained at Step S101 and the positions of the broadcast stations identified at Step S103, respectively (Step S104). The broadcast station selection unit 103 compares the distances to the broadcast stations to select a predetermined number of broadcast stations as candidates by prioritizing stations having shorter distances in order (Step S105). Then, the broadcast station selection unit 103 selects a broadcast station at the highest rank (namely, a broadcast station closest to the current position) among the candidate broadcast stations (Step S106).

Note that, if the broadcast station selected at Step S106 is the broadcast station from which the radio wave is currently received by the radio broadcast reception unit 106 (YES at Step S107), the process ends without executing further steps. On the other hand, if the broadcast station selected at Step S106 is not the broadcast station from which the radio wave is currently received by the radio broadcast reception unit 106 (NO at Step S107), the radio broadcast reception unit 106 receives a radio wave broadcast using the frequency of the newly selected broadcast station (Step S108).

Next, if the signal-to-noise ratio of the radio wave broadcast obtained by the reception quality obtainment unit 105 is greater than or equal to the threshold (YES at Step S109), the broadcast station selection unit 103 has the radio broadcast output unit 107 output the radio wave broadcast as it is (Step S110). Then, the broadcast station selection unit 103 has the information output unit 108 output the name and/or the frequency of the broadcast station being received (Step S111). Note that the output volume of the radio wave broadcast output at Step S110 may be temporarily raised to a certain level so that it can be heard by a user.

On the other hand, if the signal-to-noise ratio of the radio wave broadcast is less than the threshold (NO at Step S109) and all candidates selected at Step S105 have been tried (YES at Step S112), the broadcast station selection unit 103 has the information output unit 108 output a message stating that a broadcast station cannot be selected (Step S113). Or, if the signal-to-noise ratio of the radio wave broadcast is less than the threshold (NO at Step S109) but not all candidates selected at Step S105 have been tried (NO at Step S112), the broadcast station selection unit 103 picks up the next rank broadcast station among the candidates selected at Step S105 (Step S114). Then, Step S108 is executed again.

By the above process, the information processing apparatus 100 in the present embodiment can indicate an emergency signal to a user at, a destination by automatically selecting an appropriate broadcast station.

4.2 Process Flow of Information Processing Apparatus (Not Moved)

Figure 8:
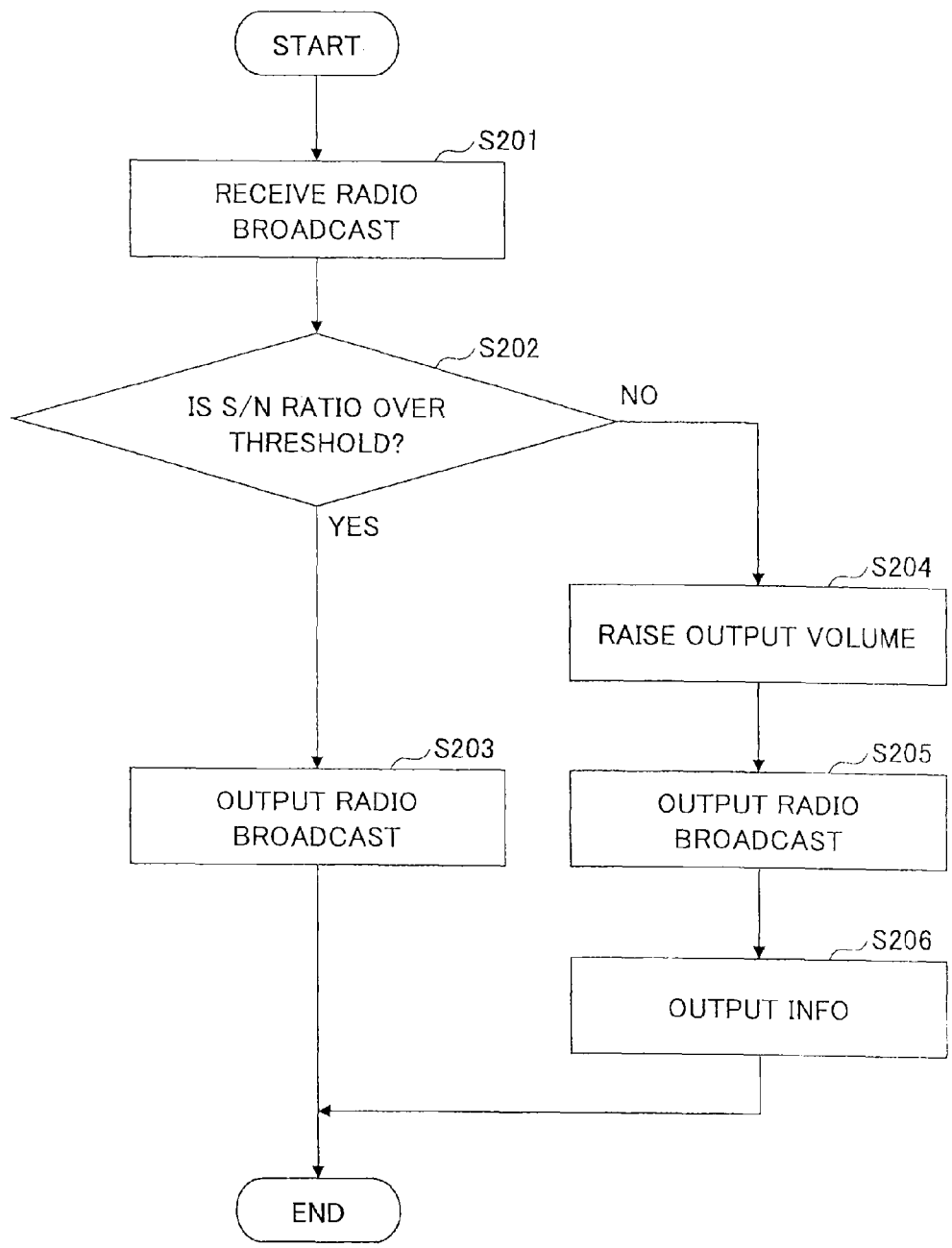
FIG. 8 is a flowchart illustrating a process of an information processing apparatus.

FIG. 8 is a flowchart of a process while the information processing apparatus 100 does not move.

First, the radio broadcast reception unit 106 receives a radio wave broadcast from a broadcast station selected by the process illustrated in FIG. 7 (Step S201). Next, if the signal-to-noise ratio of the radio wave broadcast obtained by the reception quality obtainment unit 105 is greater than or equal to the threshold (YES at Step S202), the broadcast station selection unit 103 has the radio broadcast output unit 107 output the radio wave broadcast as it is (Step S203).

On the other hand, if the signal-to-noise ratio of the radio wave broadcast is less than the threshold (NO at Step S202), the broadcast station selection unit 103 issues a command to the volume adjustment unit 110 to raise the output volume to a predetermined level, although it can be less than the level used when an emergency signal is received (Step S204). Next, the radio broadcast output unit 107 outputs the radio wave broadcast at the output volume value received from the volume adjustment unit 110 (Step S205). Next, the broadcast station selection unit 103 has the information output unit 108 output a message stating that the reception quality of the radio wave has been reduced (Step S206).

By the above process, the user is able to know that the reception quality of the radio wave has been reduced due to a change in an environment at the same position.

4.3 Operational Sequence of Information Processing Apparatus

Figure 9:
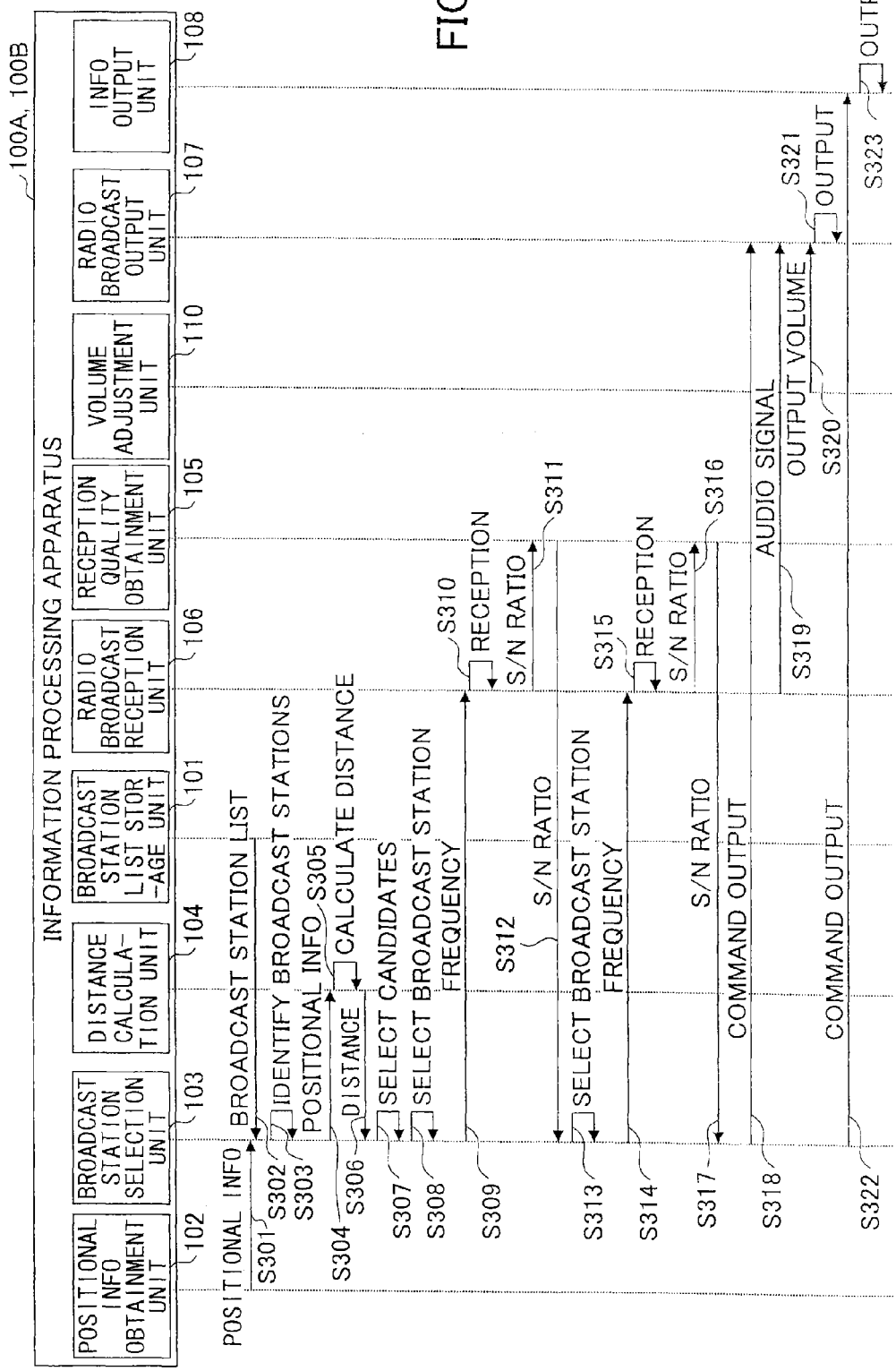
FIG. 9 is a sequence chart illustrating an operational example of an information processing apparatus.

FIG. 9 is a sequence chart illustrating an operational example of the information processing apparatus 100 in the present embodiment. Here, example will be described where an information processing apparatus 100 that is receiving a radio wave broadcast from a broadcast station "Higooguni" (see FIGS. 5-6) moves to a position at the latitude 32.9500° and longitude 131.1230° (a position designated by a star mark in FIG. 6).

First, the positional information obtainment unit 102 transfers positional information representing the current position (latitude 32.9500° and longitude 131.1230°) obtained from a GPS satellite or an IMES transmitter to the broadcast station selection unit 103 (Step S301). Next, she broadcast station selection unit 103 reads the broadcast station list (FIG. 5) stored in the broadcast station list storage unit 101 (Step S302). Then, the broadcast station selection unit 103 identifies broadcast stations within a predetermined range using the latitude and longitude indicated by the positional information obtained at Step S301 (for example, latitude ±0.2°, and longitude ±0.2°) (Step S303). Here, the following broadcast stations are identified that are in the range of the latitude of "32.7500 to 33.1500" and longitude of "130.9230 to 1313230".

Higooguni: latitude 33.1182 and longitude 131.0705
Aso: latitude 32.9485 and longitude 131.1233
Soyou: latitude 32.8515 and longitude 131.1424

Next, the broadcast station selection unit 103 transfers the current positional information received at Step S301 and the positional information of the identified broadcast stations to the distance calculation unit 104 (Step S304). The distance calculation unit 104 calculates distances between the broadcast stations and the current position, for example, by adding the square of latitude difference and the square of longitude difference (Step S305). Here, the following values are obtained as the distances to the broadcast stations (calculated to four decimal places and rounded-off).

Higooguni: 0.031
Aso: 0.000
Soyou: 0.010

The distance calculation unit 104 returns these calculated values to the broadcast station selection unit 103 (Step S306).

The broadcast station selection unit 103 compares the distances to the broadcast stations received at Step 306 to select a predetermined number (for example, five at the maximum) of broadcast stations as candidates by prioritizing stations having shorter distances (closer to the current position) in order (Step S307). Here, candidates of the broadcast stations are selected as follows.

1. Aso
2. Soyou
3. Higooguni

Then, the broadcast station selection unit 103 selects "Aso" that is the highest ranked broadcast station among the candidate broadcast stations (Step S308), and transfers its frequency "86.3 MHz" to the radio broadcast reception unit 106 (Step S309).

The radio broadcast reception unit 106 receives the radio wave broadcast from "Aso" broadcast station using the frequency received at Step S309 (Step S310). The reception quality obtainment unit 105 obtains the signal-to-noise ratio of the signal received at the radio broadcast reception unit 106 (Step S311). Here, assume that the signal-to-noise ratio is "35 db".

The broadcast station selection unit 103 obtains the signal-to-noise ratio "35 db" obtained at Step S311 from the reception quality obtainment unit 105 (Step S312). Here, the signal-to-noise ratio is less than a predetermined threshold "40 db". Therefore, among the selected candidates, the frequency "86.8 MHz" of the broadcast station "Soyou" at the next rank is transferred to the radio broadcast reception unit 106 (Step S314).

The radio broadcast reception unit 106 receives the radio wave broadcast from "Soyou" broadcast station using the frequency received at Step S314 (Step S315). The reception quality obtainment unit 105 obtains the signal-to-noise ratio of the signal received at the radio broadcast reception unit 106 (Step S316). Here, assume that the signal-to-noise ratio is "50 db".

The broadcast station selection unit 103 obtains the signal-to-noise ratio "50 db" obtained at Step S316 from the reception quality obtainment unit 105 (Step S317). Here, the signal-to-noise ratio is greater than or equal the predetermined threshold "40 db". Therefore, the broadcast station selection unit issues a command to the radio broadcast output unit 107 to output the radio wave broadcast currently received (Step S318).

In response to receiving the command, the radio broadcast output unit 107 receives the audio signal obtained from the radio wave broadcast received by the radio broadcast reception unit 106 (Step S319). Then, the radio broadcast output unit 107 obtains the output volume from the volume adjustment unit 110 (Step S320), and externally outputs the audio signal at the output volume (Step S321).

On the other hand, the broadcast station selection unit 103 issues a command to the information output unit 108 to output the name of broadcast station of the selected broadcast station "Soyou" and its frequency "86.8 MHz" (Step S322). In response to receiving the command, the information output unit 108 outputs the name of broadcast station and the frequency to, for example, the touch panel (Step S323).

By the above operations, the information processing apparatus in the present embodiment can select an appropriate broadcast station based on the position and the radio wave quality to receive an emergency signal.

5. MODIFIED EXAMPLE 1

Next, an embodiment different from the above example will be described using FIGS. 10-11. The information processing apparatuses 100C and 100D in the present embodiment obtain positional information from a communication terminal 200, which is a separate device, by wireless communication. The information processing apparatus 100C corresponds to the information processing apparatus 100A (earthquake warning device) described above, and the information processing apparatus 100D corresponds to the information processing apparatus 100B (cellular phone) described above. Being brought together with the communication terminal 200, the information processing apparatuses 100C and 100D can indicate an emergency signal to a user.

5.1 Hardware Configuration

The information processing apparatus 100C in the present embodiment has substantially the same hardware configuration as the information processing apparatus 100A illustrated in FIG. 2, although it does not have the positional signal reception device 15. Also, the information processing apparatus 100D in the present embodiment has substantially the same hardware configuration as the information processing apparatus 100B illustrated in FIG. 3, although it does not have the positional signal reception device 25. On the other hand, the information processing apparatuses 100C and 100D in the present embodiment have wireless communication devices (not illustrated) compliant with, for example, Bluetooth (trademark) or Zigbee (trademark) to communicate with the communication terminal 200.

5.2 Functions

Figure 10:
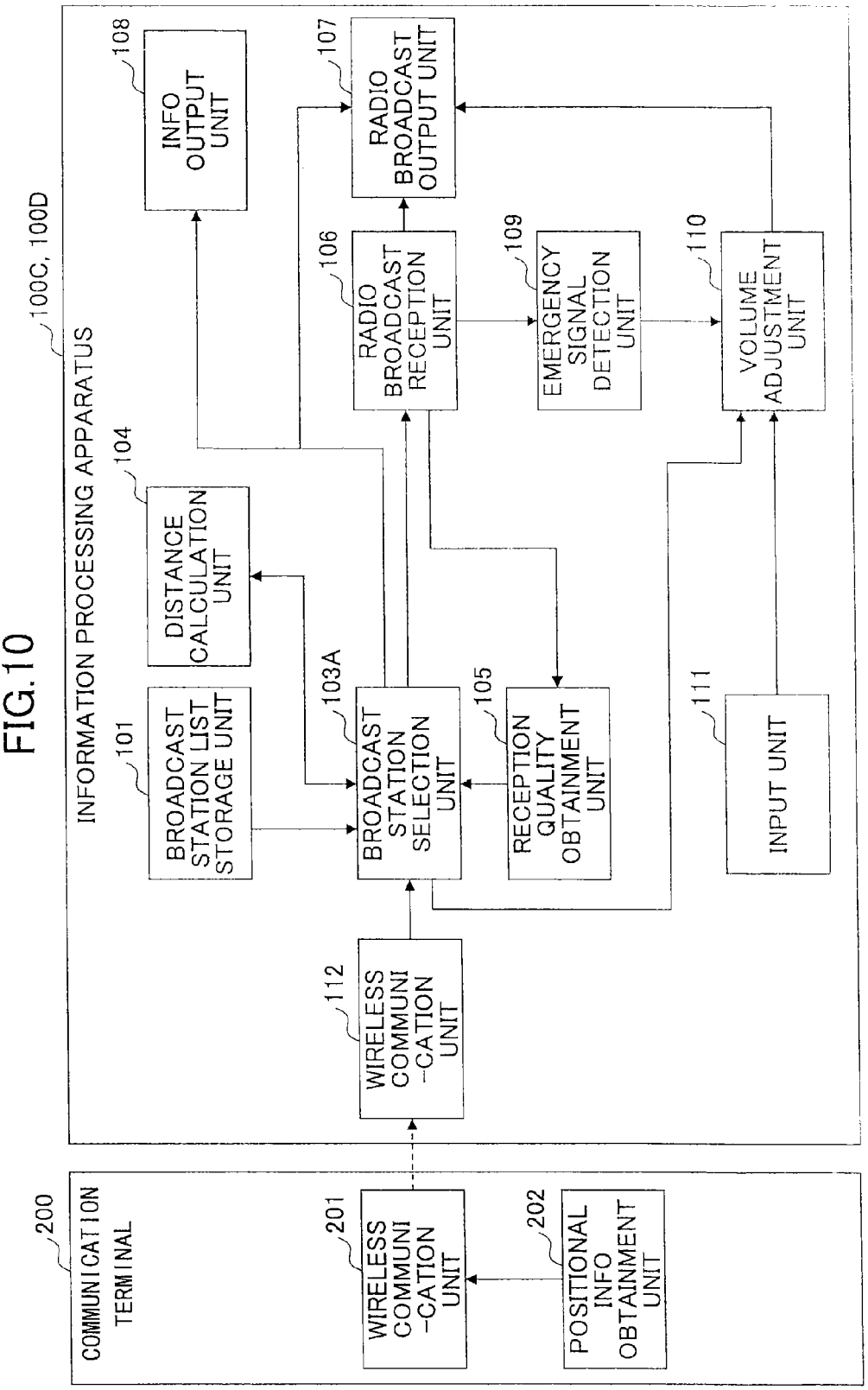
FIG. 10 is a functional block diagram of an information processing apparatus and a communication terminal according to an embodiment of the present invention.

FIG. 10 is a functional block diagram of the information processing apparatuses 100C and 100D and the communication terminal 200 according to the present embodiment.

The information processing apparatus 100C or 100D in the present embodiment newly has a wireless communication unit 112. The wireless communication unit 112 is implemented by a process of the wireless communication device described above (not illustrated) to receive positional information from the communication terminal 200 by wireless communication. Also, the broadcast station selection unit 103A of the information processing apparatus 100C or 100D receives the positional information from the wireless communication unit 112.

The communication terminal 200 in the present embodiment includes a wireless communication unit 201 and a positional information obtainment unit 202.

The wireless communication unit 201 transmits the positional information obtained by the positional information obtainment unit 202 to the information processing apparatuses 100C and 100D by wireless communication.

The positional information obtainment unit 202 receives a positioning signal transmitted from a GPS satellite or an IMES transmitter to obtain positional information (latitude and longitude) representing the current position of the information processing apparatuses 100C and 100D. The positional information obtainment unit 202 transfers the obtained positional information to the wireless communication unit 201. Note that the positional information obtainment unit 202 may repeatedly obtain the positional information at arbitrary timings.

By the above functions, the information processing apparatuses 100C and 100D not having units to obtain positional information can receive positional information via the communication terminal 200 to select an appropriate broadcast station based on the position and the radio wave quality to receive an emergency signal.

5.3 Operational Example

Figure 11:
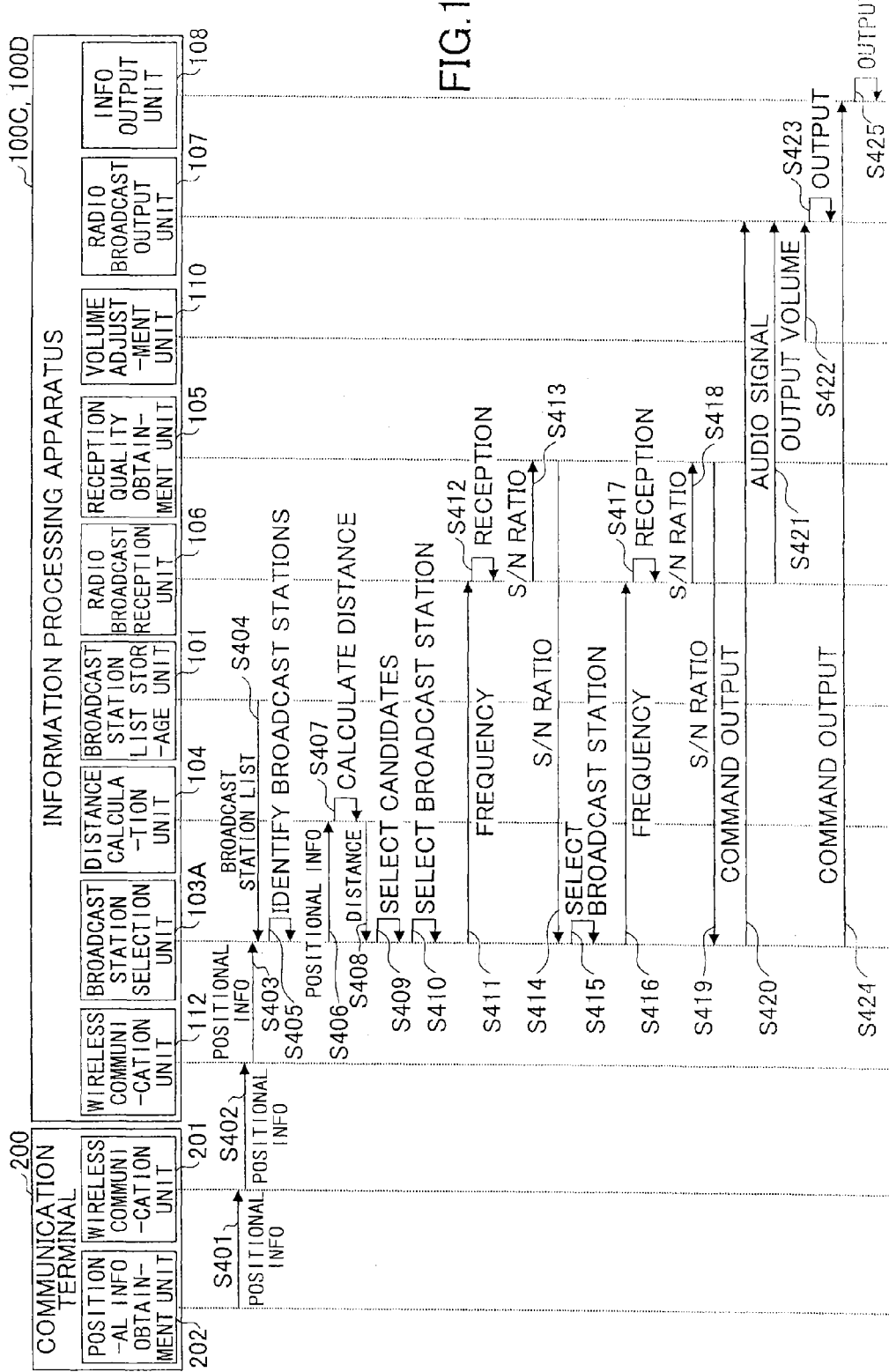
FIG. 11 is a sequence chart illustrating an operational example of an information processing apparatus.

FIG. 11 is a sequence chart illustrating an operational example of the information processing apparatuses 100C and 100D and the communication terminal 200 in the present embodiment. Here, similarly as in the example used in FIG. 9, an example will be described where the information processing apparatuses 100C and 100D and the communication terminal 200 that are receiving a radio wave broadcast from a broadcast station "Higooguni" move to a position at the latitude 32.9500° and longitude 131.1230°.

First, the positional information obtainment unit 202 transfers positional information representing the current position (latitude 32.9500° and longitude 131.1230°) obtained from a GPS satellite or an IMES transmitter to the wireless communication unit 201 (Step S401). The wireless communication unit 201 transmits the received positional information to the information processing apparatuses 100C and 100D (Step S402).

The wireless communication unit 112 of the information processing apparatus 100C or 100D receives the positional information transmitted from the communication terminal 200 at Step S402 and transfers the positional information to the broadcast station selection unit 103A (Step S403).

After that, Steps S404-S425 are similarly executed as Steps S302-S323 in FIG. 9 where the information processing apparatus reads a list of broadcast stations, selects broadcast stations one by one prioritizing those having shorter distances, and outputs the broadcast from the selected broadcast station if a certain reception quality is satisfied. Consequently, the broadcast station "Soyou" is selected, and its broadcast is output.

By the above operations, the information processing apparatuses 100C and 100D in the present embodiment can select a broadcast station using positional information obtained by the communication terminal 200 even if they do not have a function to obtain positional information by themselves. Also, by selecting a broadcast station having a certain quality or greater, a user is able to recognize an emergency signal more securely.

6. MODIFIED EXAMPLE 3

Next, yet another embodiment different from the above examples will be described using FIGS. 12-14. An information processing apparatus 100E in the present embodiment selects a broadcast station based on positional information obtained by itself. However, the information processing apparatus 100E does not hold a broadcast station list in it, which is different from the embodiments described above. Therefore, the information processing apparatus 100E obtains candidates of broadcast stations to be selected from an information providing device 300 via a network. The information processing apparatus 100E corresponds to the information processing apparatus 100B (cellular phone) described above.

6.1 Hardware Configuration

The information processing apparatus 100E in the present embodiment has substantially the same hardware configuration as the information processing apparatus 100B illustrated in FIG. 3. Also, the information providing device 300 in the present embodiment is constituted with one or more computers accessible via the Internet or a cellular phone network.

6.2 Functions

Figure 12:
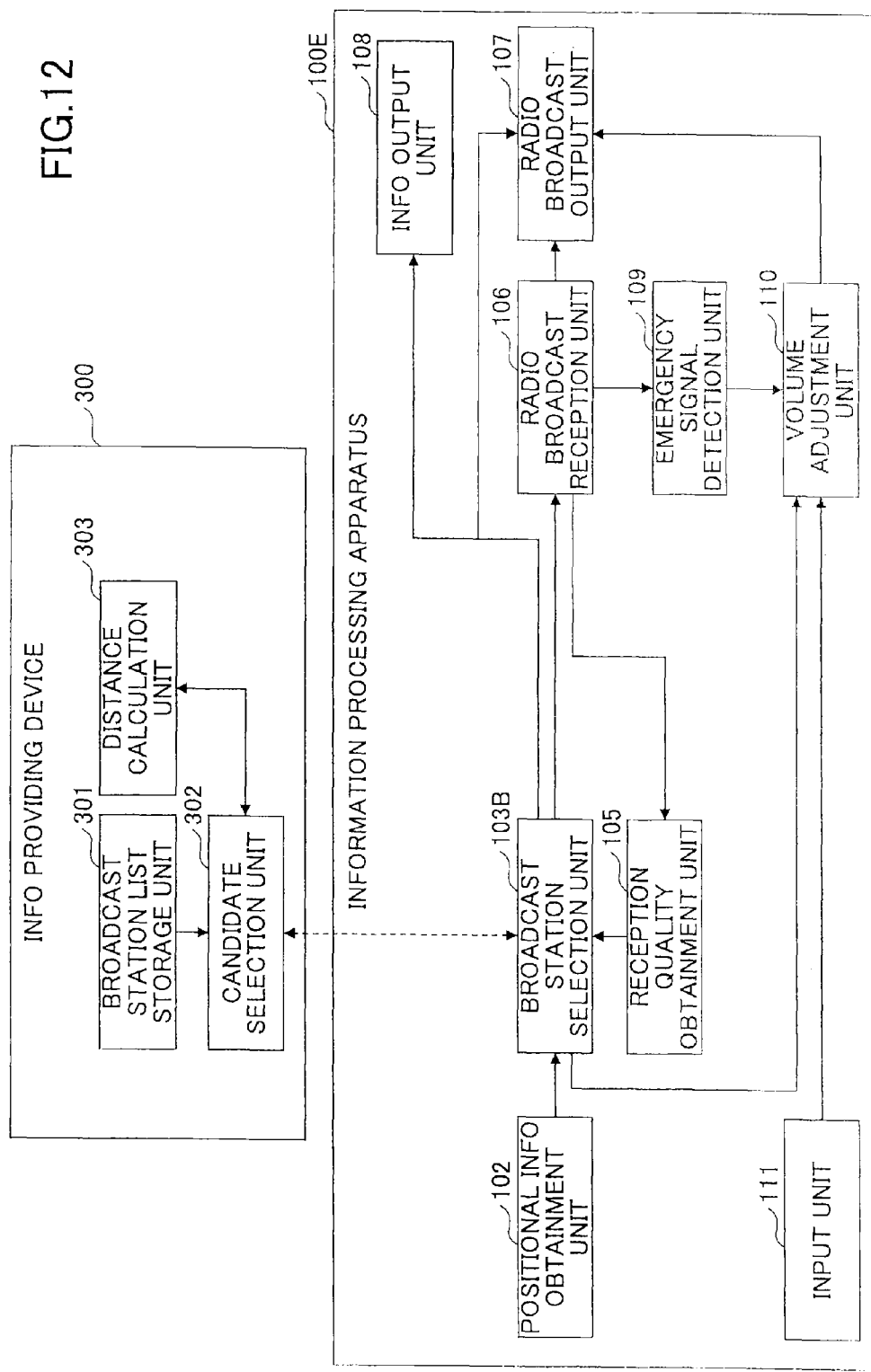
FIG. 12 is a functional block diagram of an information processing system according to an embodiment of the present invention.

FIG. 12 is a functional block diagram of the information processing apparatus 100E and the information providing device 300 (collectively referred to as the "information processing system") according to the present embodiment.

A broadcast station selection unit 103B of the information processing apparatus 100E in the present embodiment is implemented by processes of the CPU 21, the radio broadcast reception device 24, and the wireless communication device 26 illustrated in FIG. 3. After receiving positional information from the positional information obtainment unit 102, the broadcast station selection unit 103B transfers the positional information to the information providing device 300. Then, it receives candidates of broadcast stations from the information providing device 300. Among the received candidates of broadcast stations, the broadcast station selection unit 103B selects broadcast stations that satisfy a predetermined condition (having closer distances and communication quality greater than or equal to a threshold) as described above.

The information providing device 300 in the present embodiment includes a broadcast station list storage unit 301, a candidate selection unit 302, and a distance calculation unit 303.

Similarly to the broadcast station list storage unit 101 illustrated in FIG. 4, the broadcast station list storage unit 301 stores a broadcast station list that is a list of broadcast stations (FIG. 5).

When receiving the positional information from the information processing apparatus 100E, the candidate selection unit 302 reads the broadcast station list stored in the broadcast station list storage unit 101. Next, the candidate selection unit 302 identifies broadcast stations within a predetermined range (for example, latitude ±05°, longitude ±05°) from the latitude and longitude indicated by the received positional information. Next, the candidate selection unit 302 transfers the current positional information and the positional information of the identified broadcast stations to the distance calculation unit 303 to obtain distances to the identified broadcast stations from the current position. Next, the candidate selection unit 302 compares the distances to the broadcast stations to select a predetermined number of broadcast stations as candidates by prioritizing stations having shorter distances (closer to the current position) in order. Then, the candidate selection unit 302 indicates the selected candidates to the information processing apparatus 100E.

Similarly as done by the distance calculation unit 104 illustrated in FIG. 4, the distance calculation unit 303 calculates distances between the broadcast stations and the current position, using the positional information representing the current position of the information processing apparatus and the positional information representing the positions of the broadcast stations received from the candidate selection unit 302.

By the above functions, the information processing apparatus 100E in the present embodiment does not need to manage a broadcast station list by itself to calculate distances between a current position and broadcast stations. Consequently, required calculation capability is reduced for selecting broadcast stations. Also, a storage area is not required for storing a broadcast station list.

6.3 Operational Examples

Next, using FIGS. 13-14, operational examples of the information processing system will be described according to the present embodiment.

(Process Flow of Information Processing Apparatus (Soon after being Moved))

FIG. 13 is a flowchart of a process to select a broadcast station using new positional information after the information processing apparatus 100E in the present embodiment has been moved by a user.

The positional information obtainment unit 102 obtains positional information representing the current position of the information processing apparatus 100 by a positioning signal transmitted from a GPS satellite or an IMES transmitter (Step S501). Next, the broadcast station selection unit 103 transmits the positional information obtained at Step S502 to the information providing device 300 (Step S502). Then, the broadcast station selection unit 103 obtains the candidates of broadcast stations generated by the information providing device 300 (Step S503).

After that, Steps S504-S512 are similarly executed as Steps S106-S114 in FIG. 7 where a broadcast station is selected that can receive the broadcast with a certain quality, and if there are no broadcast stations as such, an error is output.

By the above process, the information processing apparatus 100E can select a broadcast station from which a broadcast can be received with a certain quality to receive an emergency signal, without calculating distances to broadcast stations from a current position.

(Process Flow of Information Processing Apparatus (Not Moved))

A flowchart of a process while the information processing apparatus 100E does not move in the present embodiment is the same as FIG. 8.

(Operational Sequence of Information Processing Apparatus)

FIG. 14 is a sequence chart illustrating an operational example of the information processing apparatus 100E and the information providing device 300 in the present embodiment. Here, similarly as in the example used in FIG. 9, an example will be described where the information processing apparatus 100E that is receiving a radio wave broadcast from a broadcast station "Higooguni" moves to a position at the latitude 32.9500° and longitude 131.1230°.

First, the positional information obtainment unit 102 of the information processing apparatus 100E transfers positional information representing the current position (latitude 32.9500° and longitude 131.1230°) obtained from a GPS satellite or an IMES transmitter to the broadcast station selection unit 103B (Step S601). The broadcast station selection unit 103B transmits the received positional information to the information providing device 300 (Step S602).

When receiving the positional information transmitted at Step S602, the candidate selection unit 302 of the information providing device 300 reads the broadcast station list (FIG. 5) stored in the storage unit 301 (Step S603). Then, the candidate selection unit 302 identifies broadcast stations within a predetermined range using the latitude and longitude indicated by the positional information obtained at Step S602 (for example, latitude ±0.2°, and longitude ±0.2°) (Step S604). Here, the following broadcast stations are identified that are in the range of the latitude of "32.7500 to 33.1500" and longitude of "130.9230 to 1313230".

Higooguni: latitude 33.1182 and longitude 131.0705
Aso: latitude 32.9485 and longitude 131.1233
Soyou: latitude 32.8515 and longitude 131.142

Next, the candidate selection unit 302 transfers the current positional information received at Step S602 and the positional information of the broadcast stations identified at Step S604 to the distance calculation unit 303 (Step S605). The distance calculation unit 303 calculates distances between broadcast stations and the current position, for example, by adding the square of latitude difference and the square of longitude difference (Step S606). Here, the following values are obtained as the distances to the broadcast stations (calculated to four decimal places and rounded-off).

Higooguni: 0.031
Aso: 0.000
Soyou: 0.010

The distance calculation unit 303 returns these calculated values to the broadcast station selection unit 302 (Step S607).

The candidate selection unit 302 compares the distances to the broadcast stations received at Step S607 to select a predetermined number (for example, five at the maximum) of broadcast stations as candidates by prioritizing stations having shorter distances (closer to the current position) in order (Step S608). Here, candidates of the broadcast stations are selected as follows.
1. Aso
2. Soyou
3. Higooguni Then, the candidate selection unit 302 transmits the above candidates to the information processing apparatus 100E (Step S609).

After that, Steps S610-S625 are similarly executed as Steps S308-S323 in FIG. 9 where the information processing apparatus 100E selects broadcast stations one by one prioritizing those having shorter distances, and outputs the broadcast from the selected broadcast station if a certain reception quality is satisfied. Consequently, the broadcast station "Soyou" is selected, and its broadcast is output.

By the above operations, the information processing apparatus 100E in the present embodiment can appropriately select a broadcast station based on a current position among candidates of broadcast stations provided by the information providing device 300 to receive an emergency signal.

Further, the present invention is not limited to these embodiments and examples described above, but various variations and modifications may be made without departing from the scope of the present invention.

The present application is based on and claims the benefit of priority of Japanese Priority Application No. 2013-172303 filed on Aug. 22, 2013, and Japanese Priority Application No. 2014-154375 filed on Jul. 30, 2014, with the Japanese Patent Office, the entire contents of which are hereby incorporated by reference.

What is claimed is:

1. An information processing apparatus configured to detect an emergency signal, the apparatus comprising:
    processing circuitry configured to obtain positional information representing a current position of the information processing apparatus, and select one of a plurality of broadcast stations using the obtained positional information; and
    a receiver configured to receive a radio wave signal at a frequency of the selected broadcast station,
    wherein the processing circuitry is further configured to output an audio signal obtained by demodulating the radio wave signal received by the receiver.

2. The information processing apparatus as claimed in claim 1, wherein the processing circuitry is further configured to
    adjust an output volume of the output audio signal, and detect the emergency signal included in the audio signal,
    wherein the processing circuitry is further configured to output the audio signal with the output volume being greater when the emergency signal is detected than when the emergency signal is not detected.

3. The information processing apparatus as claimed in claim 2, wherein the processing circuitry is further configured to calculate distances between the current position indicated by the positional information and positions of the broadcast stations, respectively, and select the broadcast station having the minimum distance.

4. The information processing apparatus as claimed in claim 3, wherein the processing circuitry is further configured to obtain a signal-to-noise ratio of a radio wave broadcast being received,
    wherein, when the obtained signal-to-noise ratio is less than a threshold, the processing circuitry is configured to select another of the broadcast stations having the signal-to-noise ratio greater than or equal to the threshold, and having the minimum distance.

5. The information processing apparatus as claimed in claim 4, wherein the processing circuitry is further configured to output at least one of a name and a frequency of the selected broadcast station.

6. The information processing apparatus as claimed in claim 5, wherein the processing circuitry is further configured to output a message when any of the broadcast stations does not have the signal-to-noise ratio greater than or equal to the threshold.

7. The information processing apparatus as claimed in claim 5, wherein the processing circuitry is further configured to output a message when the signal-to-noise ratio of the radio wave broadcast being received by the receiver becomes less than the threshold.

8. The information processing apparatus as claimed in claim 2, wherein the processing circuitry is further configured to make the output volume greater for a certain period after the broadcast station is selected than the output volume set before the broadcast station is selected.

9. The information processing apparatus as claimed in claim 1, wherein the processing circuitry is further configured to obtain the positional information using a positioning signal transmitted from a GPS satellite or an IMES transmitter.

10. The information processing apparatus as claimed in claim 1, wherein the processing circuitry is further configured to transmit the positional information representing the current position of the information processing apparatus to an information providing device to receive information about candidates of the broadcast stations, depending on the position indicated by the positional information.

11. A method executed by an information processing apparatus configured to detect an emergency signal, the method comprising:
obtaining positional information representing a current position of the information processing apparatus;
selecting one of a plurality of broadcast stations using the obtained positional information; and
receiving a radio wave signal at a frequency of the selected broadcast station.

12. An information processing system comprising:
an information processing apparatus configured to detect an emergency signal; and
an information providing device configured to communicate with the information processing apparatus,
wherein the information processing apparatus includes
processing circuitry configured to obtain positional information representing a current position of the information processing apparatus,
a first transmitter configured to transmit the positional information obtained by the processing circuitry to the information providing device, wherein the processing circuitry is further configured to select one of a plurality of broadcast stations using the obtained positional information, and
a receiver configured to receive a radio wave signal at a frequency of the selected broadcast station,
wherein the processing circuitry is further configured to output an audio signal obtained by demodulating the received radio wave signal, and
the information providing device includes a second transmitter configured to transmit information indicating candidates of the broadcast stations generated based on the positional information received from the first transmitter, back to the information processing apparatus.

13. The information processing apparatus of claim 1, further comprising a memory storing broadcast station positional information of each of the plurality of broadcast stations, wherein the processing circuitry is further configured to select the one of the plurality of broadcast stations using the obtained positional information and the stored broadcast station positional information.

* * * * *